US012794659B2

(12) United States Patent
Choi et al.

(10) Patent No.: US 12,794,659 B2
(45) Date of Patent: Nov. 10, 2026

(54) INTEGRATED CIRCUIT PERFORMING LOOPBACK OPERATION AND METHOD OF OPERATING THE SAME

(71) Applicant: SK hynix Inc., Gyeonggi-do (KR)

(72) Inventors: Jong Hyuck Choi, Gyeonggi-do (KR); Dae Han Kwon, Gyeonggi-do (KR); Sang Sic Yoon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 23 days.

(21) Appl. No.: 18/976,355

(22) Filed: Dec. 11, 2024

(65) Prior Publication Data

US 2026/0088969 A1 Mar. 26, 2026

(30) Foreign Application Priority Data

Sep. 24, 2024 (KR) ........................ 10-2024-0128858

(51) Int. Cl.
*H04L 7/00* (2006.01)

(52) U.S. Cl.
CPC .................................. *H04L 7/0041* (2013.01)

(58) Field of Classification Search
CPC ...................................................... H04L 7/0041
See application file for complete search history.

(56) References Cited

U.S. PATENT DOCUMENTS

| | | | | |
|---|---|---|---|---|
| 11,087,835 | B2 | 8/2021 | Akamatsu et al. | |
| 2007/0127614 | A1 * | 6/2007 | Kawakami | H03L 7/06 375/373 |
| 2019/0189184 | A1 * | 6/2019 | Penney | G11C 7/222 |
| 2023/0326514 | A1 * | 10/2023 | Ayyapureddi | G11C 11/221 |
| 2023/0378961 | A1 * | 11/2023 | Bhakta | H03L 7/0814 |

FOREIGN PATENT DOCUMENTS

| | | | |
|---|---|---|---|
| KR | 10-2015-0028345 | A | 3/2015 |

* cited by examiner

*Primary Examiner* — Syed Haider
(74) *Attorney, Agent, or Firm* — IP&T GROUP LLP

(57) ABSTRACT

An integrated circuit may include first to $N^{th}$ data receiving circuits configured to receive, based on multi-phase clocks, first to $N^{th}$ data through first to $N^{th}$ data terminals to generate first to $N^{th}$ multi-phase data, respectively, where N is an integer equal to or greater than 2; first to $N^{th}$ delay circuits configured to delay first to $N^{th}$ data having a selected phase, among the first to $N^{th}$ multi-phase data, respectively; a clock delay circuit configured to delay a clock having the selected phase, among the multi-phase clocks; and a loopback circuit configured to transmit a clock delayed by the clock delay circuit to a loopback clock terminal, and transmit, based on the clock delayed by the clock delay circuit, one of first to $N^{th}$ data having the selected phase, delayed by the first to $N^{th}$ delay circuits, to a loopback data terminal.

20 Claims, 5 Drawing Sheets

INTEGRATED CIRCUIT PERFORMING LOOPBACK OPERATION AND METHOD OF OPERATING THE SAME

CROSS-REFERENCE TO RELATED APPLICATION(S)

This application claims priority under 35 U.S.C. § 119 to Korean Patent Application No. 10-2024-0128858, filed on Sep. 24, 2024, which is incorporated herein by reference in its entirety.

BACKGROUND

1. Technical Field

Various embodiments of the present disclosure relate to an integrated circuit, and more particularly, to a technique for verifying a receiving operation of the integrated circuit.

2. Related Art

A memory stores write data transmitted from a memory controller and provides the stored data as read data. When an error occurs in the write data during the receiving process of the write data, an error occurs in all operations of the memory. Therefore, verification of data receiving circuits of the memory is greatly important.

One of the methods for verifying a data receiving operation of the memory is the use of a loopback operation. The loopback operation refers to the operation of transmitting the data received by the memory back to the memory controller and verifying the transmitted data.

SUMMARY

In accordance with an embodiment of the present disclosure, an integrated circuit may include a loopback clock terminal; a loopback data terminal; a first data terminal; a second data terminal disposed farther from the loopback data terminal than the first data terminal; a first data receiver configured to receive first data through the first data terminal; a second data receiver configured to receive second data through the second data terminal; a first sampler configured to sample, based on multi-phase clocks, the first data received by the first data receiver to generate multi-phase first data; a second sampler configured to sample, based on the multi-phase clocks, the second data received by the second data receiver to generate multi-phase second data; a first delay circuit configured to delay one of the multi-phase first data; a second delay circuit configured to delay one of the multi-phase second data, the second delay circuit having a larger delay value than the first delay circuit; a clock delay circuit configured to delay one of the multi-phase clocks; a loopback data sampler configured to sample, based on a clock delayed by the clock delay circuit, one of data delayed by the first delay circuit and data delayed by the second delay circuit; a loopback data transmitter configured to transmit data sampled by the loopback data sampler to the loopback data terminal; and a loopback clock transmitter configured to transmit the clock delayed by the clock delay circuit to the loopback clock terminal.

In accordance with an embodiment of the present disclosure, an integrated circuit may include first to $N^{th}$ data receiving circuits configured to receive, based on multi-phase clocks, first to $N^{th}$ data through first to $N^{th}$ data terminals to generate first to $N^{th}$ multi-phase data, respectively, where "N" is an integer equal to or greater than 2; first to $N^{th}$ delay circuits configured to delay first to $N^{th}$ data having a selected phase, among the first to $N^{th}$ multi-phase data, respectively; a clock delay circuit configured to delay a clock having the selected phase, among the multi-phase clocks; and a loopback circuit configured to transmit a clock delayed by the clock delay circuit to a loopback clock terminal, and transmit, based on the clock delayed by the clock delay circuit, one of first to $N^{th}$ data having the selected phase, delayed by the first to $N^{th}$ delay circuits, to a loopback data terminal.

In accordance with an embodiment of the present disclosure, a method of operating an integrated circuit may include receiving, based on multi-phase clocks, first to $N^{th}$ data through first to $N^{th}$ data terminals to generate first to $N^{th}$ multi-phase data, respectively, where N is an integer equal to or greater than 2; delaying first to $N^{th}$ data having a selected phase, among the first to $N^{th}$ multi-phase data, respectively; delaying a clock having the selected phase, among the multi-phase clocks; and transmitting the delayed clock to a loopback clock terminal, and transmitting, based on the delayed clock, one of the delayed first to $N^{th}$ data having the selected phase, to a loopback data terminal.

DETAILED DESCRIPTION

Various embodiments of the present disclosure are directed to technology of stably operating a loopback operation of an integrated circuit.

According to embodiments of the present disclosure, it is possible to perform a loopback operation while compensating for a skew difference according to positions of data terminals of an integrated circuit.

Hereinafter, various embodiments according to the technical spirit of the present disclosure are described below with reference to the accompanying drawings.

Figure 1:
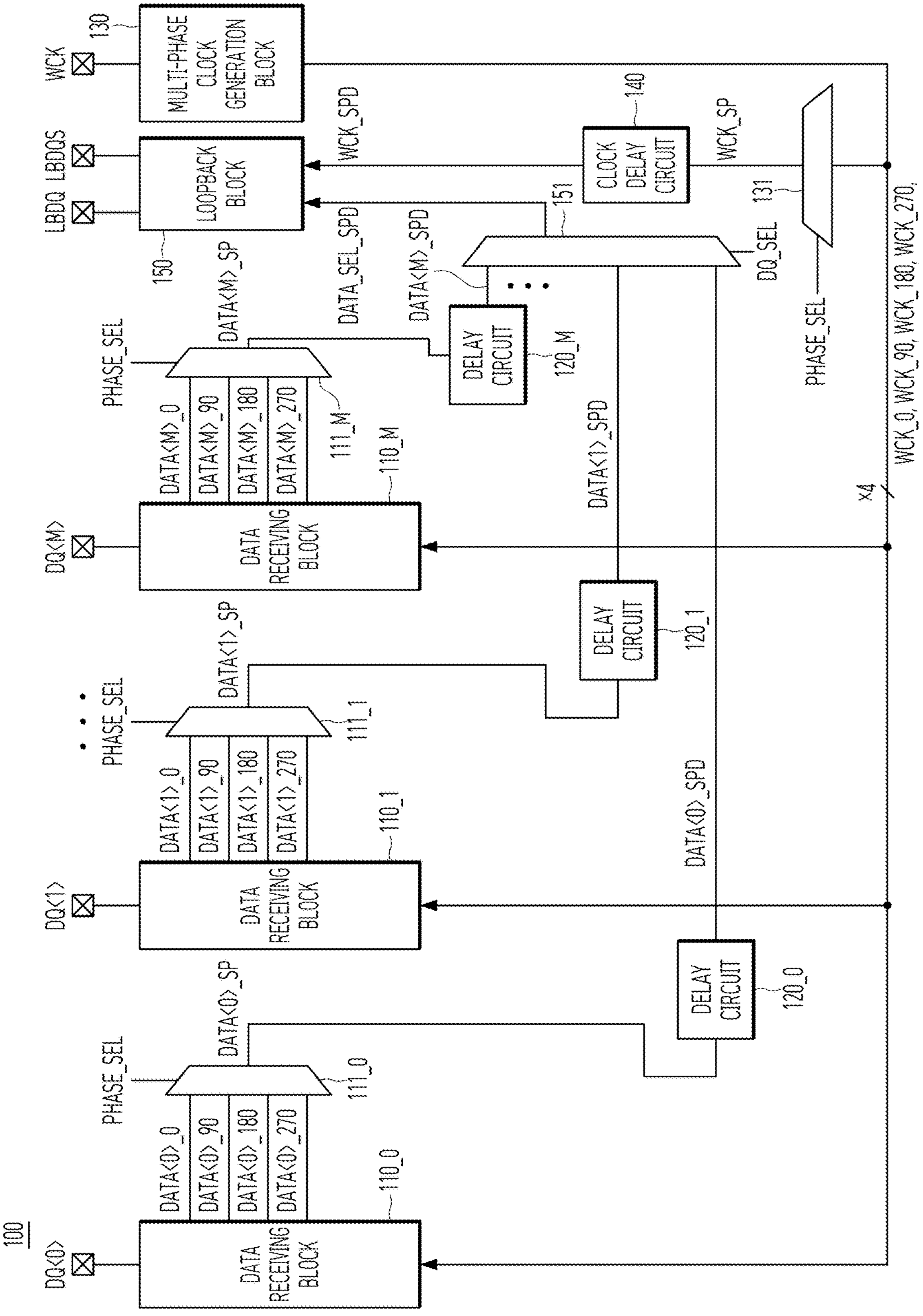
FIG. 1 is a block diagram illustrating a memory in accordance with an embodiment of the present disclosure.

FIG. 1 is a block diagram illustrating a memory 100 in accordance with an embodiment of the present disclosure. FIG. 1 illustrates portions related to a loopback operation in the memory 100.

Referring to FIG. 1, the memory 100 may include data terminals DQ<0> to DQ<M>, a data clock terminal WCK, a loopback clock terminal LBDQS, a loopback data terminal LBDQ, data receiving circuits 110_0 to 110_M, delay circuits 120_0 to 120_M, a multi-phase clock generation circuit 130, a clock delay circuit 140, a loopback circuit 150, data phase selectors 111_0 to 111_M, a clock phase selector 131, and a data terminal selector 151.

The data terminals DQ<0> to DQ<M> are terminals through which data are inputted to and outputted from the memory 100, where "M" is an integer equal to or greater than 1. The data terminals DQ<0> to DQ<M> may be physically positioned to be close to and far from the loopback circuit 150 and the loopback clock terminal LBDQS. Herein, the data terminal DQ<0> is the farthest data terminal from the loopback circuit 150, and the data terminal DQ<M> is the closest data terminal to the loopback circuit 150.

The data clock terminal WCK is a terminal to which a data clock for strobing the data inputted to the data terminals DQ<0> to DQ<M> is inputted. The data is inputted to each of the data terminals DQ<0> to DQ<M> at a rising edge and a falling edge of the data clock. Herein, one data clock terminal WCK is illustrated, but the data clock may be a differential signal, and the data clock terminal WCK may be configured with two terminals for receiving the differential signal.

The loopback data terminal LBDQ is a terminal to which data looped back by the memory 100 is outputted. Data having a selected phase of a selected data terminal among the data terminals DQ<0> to DQ<M> is outputted to the loopback data terminal LBDQ. A data rate of the data outputted to the loopback data terminal LBDQ may be ¼ of a data rate of the data inputted to the data terminals DQ<0> to DQ<M>. Because the data rate of the data looped back through the loopback data terminal LBDQ is low, there is a low possibility that an error occurs during a loopback process. Namely, it may be possible to exclude an error occurring during the loopback process of data and detect an error occurring during a data receiving process. The loopback data terminal LBDQ may include a dedicated terminal for outputting loopback data, and a data terminal that is not used for the loopback operation may be used as the loopback data terminal. For example, during the loopback operation for verification of the data terminals DQ<0> to DQ<7>, the data terminal DQ<8> may be used as the loopback data terminal LBDQ, and during the loopback operation for verification of the data terminals DQ<8> to DQ<15>, the data terminal DQ<7> may be used as the loopback data terminal LBDQ. The loopback data terminal LBDQ may refer to a dedicated terminal only for the loopback operation or a data terminal used for the loopback operation.

The loopback clock terminal LBDQS is a terminal to which a loopback clock for strobing data outputted to the loopback data terminal LBDQ is outputted. Because the loopback clock is a clock for strobing data, it is also referred to as a loopback data strobe signal. The loopback clock terminal LBDQS may include a dedicated terminal for outputting the loopback clock, and a read data strobe signal terminal RDQS for outputting a read data strobe signal may be used as the loopback clock terminal LBDQS. The loopback clock terminal LBDQS may refer to a dedicated terminal only for the loopback operation or the read data strobe signal terminal RDQS used for outputting the loopback clock.

The multi-phase clock generation circuit 130 may generate multi-phase clocks WCK_0, WCK_90, WCK_180, and WCK_270 using the data clock inputted to the data clock terminal WCK. A frequency of the multi-phase clocks WCK_0, WCK_90, WCK_180, and WCK_270 is ½ of a frequency of the data clock, and phases of the multi-phase clocks WCK_0, WCK_90, WCK_180, and WCK_270 may differ by 90°.

The data receiving circuits 110_0 to 110_M may receive data through the data terminals DQ<0> to DQ<M> using the multi-phase clocks WCK_0, WCK_90, WCK_180, and WCK_270. The data receiving circuit 110_0 may receive data of the data terminal DQ<0> using the multi-phase clocks WCK_0, WCK_90, WCK_180, and WCK_270, and generate first multi-phase data DATA<0>_0, DATA<0>_90, DATA<0>_180, and DATA<0>_270. The data receiving circuit 110_1 may receive data of the data terminal DQ<1> using the multi-phase clocks WCK_0, WCK_90, WCK_180, and WCK_270, and generate second multi-phase data DATA<1>_0, DATA<1>_90, DATA<1>_180, and DATA<1>_270. Similarly, the data receiving circuit 110_M may receive data of the data terminal DQ<M> using the multi-phase clocks WCK_0, WCK_90, WCK_180, and WCK_270, and generate $(M+1)^{th}$ multi-phase data DATA<M>_0, DATA<M>_90, DATA<M>_180, and DATA<M>_270.

The data phase selectors 111_0 to 111_M may select data having a phase selected by phase selection information PHASE_SEL among the multi-phase data DATA<0>_0 to DATA<0>_270, DATA<1>_0 to DATA<1>_270, and DATA<M>_0 to DATA<M>_270 received by the data receiving circuits 110_0 to 110_M. For example, the data phase selector 111_1 may select and output one of the multi-phase data DATA<1>_0, DATA<1>_90, DATA<1>_180, and DATA<1>_270 generated by the data receiving circuit 110_1, according to the phase selection information PHASE_SEL.

The delay circuits 120_0 to 120_M may delay data DATA<0>_SP, DATA<1>_SP, and DATA<M>_SP having the selected phase. The delay circuits 120_0 to 120_M may have different delay values, and a delay circuit corresponding to a terminal that is closer to the loopback clock terminal LBDQS among the data terminals DQ<0> to DQ<M> may have a larger delay value. That is, the delay circuit 120_M may have the largest delay value, and the delay circuit 120_M−1 may have the second largest delay value. In addition, the delay circuit 120_1 may have the second smallest delay value, and the delay circuit 120_0 may have the smallest delay value. Depending on design, the delay value of the delay circuit 120_0 may be designed to be substantially "0". That is, the delay circuit 120_0 may be omitted.

The clock phase selector 131 may select and output one of the multi-phase clocks WCK_0, WCK_90, WCK_180, and WCK_270 generated by the multi-phase clock generation circuit 130, according to the phase selection information PHASE_SEL. Because the clock phase selector 131 and the data phase selectors 111_0 to 111_M operate in response to the same phase selection information PHASE_SEL, a phase selected by the data phase selectors 111_0 to 111_M may be the same as a phase selected by the clock phase selector 131. For example, when the data phase selector 111_0 selects the data DATA<0>_180, the clock phase selector 131 may select the clock WCK_180.

The clock delay circuit 140 may delay a clock WCK_SP having a phase selected by the clock phase selector 131. A delay value of the clock delay circuit 140 may be set to a value corresponding to a delay value of a path through which data is transmitted from the data terminal DQ<0> disposed farthest from the loopback clock terminal LBDQS among the data terminals DQ<0> to DQ<M> to the loopback circuit 150.

The data terminal selector 151 may select one of data DATA<0>_SPD, DATA<1>_SPD, and DATA<M>_SPD obtained by the delay of the delay circuits 120_0 to 120_M, according to data terminal selection information DQ_SEL. The data terminal selection information DQ_SEL is information for selecting a data terminal to be a target for the loopback operation. Data selected by the data terminal selection information DQ_SEL and the phase selection information PHASE_SEL is the target for the loopback operation. For example, when a phase 270 is selected by the phase selection information PHASE_SEL and the data terminal DQ<0> is selected by the data terminal selection information DQ_SEL, the data DATA<0>_270 corresponding to the phase 270 inputted to the data terminal DQ<0> becomes the target for the loopback operation.

The loopback circuit 150 may transmit a clock WCK_SPD obtained by the delay of the clock delay circuit 140 to the loopback clock terminal LBDQS, and transmit data DATA_SEL_SPD selected by the data terminal selector 151 to the loopback data terminal LBDQ using the clock WCK_SPD obtained by the delay of the clock delay circuit 140.

Figure 2:
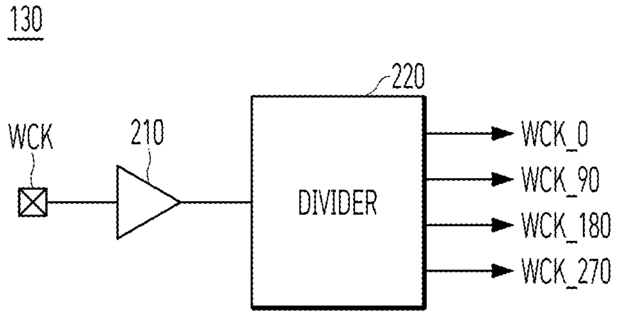
FIG. 2 is a block diagram illustrating an embodiment of a multi-phase clock generation block illustrated in FIG. 1.

FIG. 2 is a block diagram illustrating an embodiment of the multi-phase clock generation circuit 130 illustrated in FIG. 1.

Referring to FIG. 2, the multi-phase clock generation circuit 130 may include a data clock receiver 210 and a divider 220.

The data clock receiver 210 may receive the data clock of the data clock terminal WCK. As described above, the data clock may be a differential signal, and a quantity of the data clock terminal WCK may be two. Accordingly, the data clock receiver 210 may be a differential receiver.

The divider 220 may divide the data clock received by the data clock receiver 210 and generate the multi-phase clocks WCK_0, WCK_90, WCK_180, and WCK_270. The frequency of the multi-phase clocks WCK_0, WCK_90, WCK_180, and WCK_270 may be ½ of the frequency of the data clock, and the phases of the multi-phase clocks WCK_0, WCK_90, WCK_180, and WCK_270 may differ by 90°.

Figure 3:
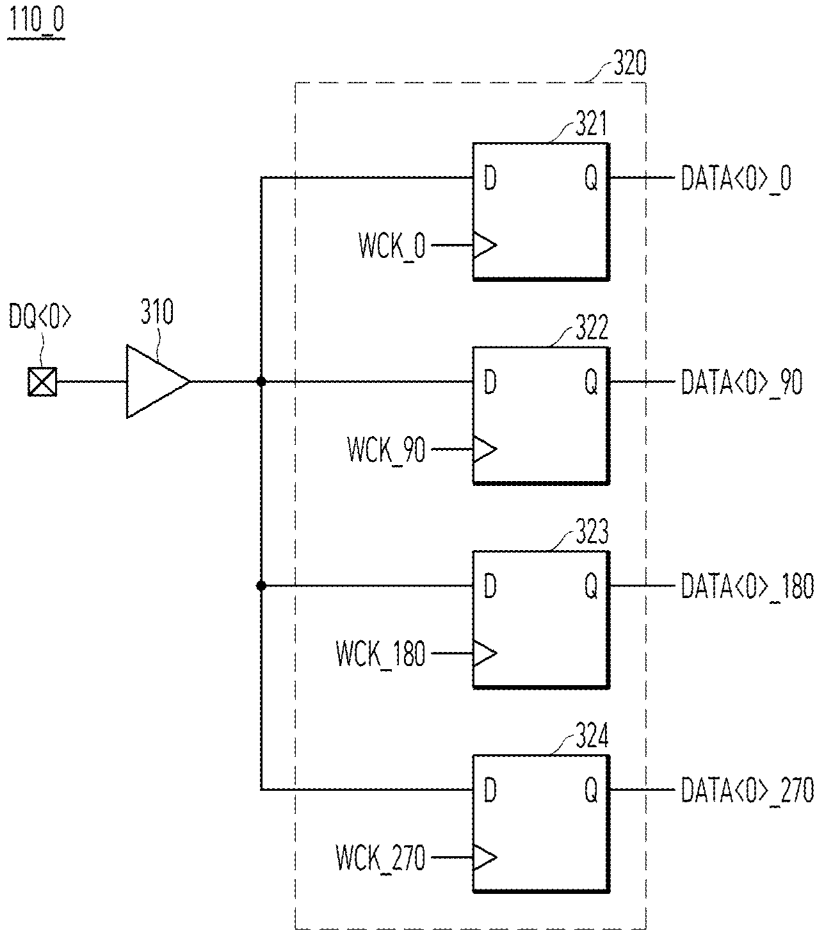
FIG. 3 is a block diagram illustrating an embodiment of a data receiving circuit illustrated in FIG. 1.

FIG. 3 is a block diagram illustrating an embodiment of the data receiving circuit 110_0 illustrated in FIG. 1.

Referring to FIG. 3, the data receiving circuit 110_0 may include a data receiver 310 and a sampler 320.

The data receiver 310 may receive data through the data terminal DQ<0>.

The sampler 320 may sample the data received by the data receiver 310 using the multi-phase clocks WCK_0, WCK_90, WCK_180, and WCK_270. The sampler 320 may include D flip-flops 321 to 324. Each of the D flip-flops 321 to 324 may sample the data at a rising edge of a corresponding multi-phase clock among the multi-phase clocks WCK_0, WCK_90, WCK_180, and WCK_270. For example, the D flip-flop 321 may sample the data at the rising edge of the multi-phase clock WCK_0 to generate the first multi-phase data DATA<0>_0, and the D flip-flop 324 may sample the data at the rising edge of the multi-phase clock WCL_270 to generate the first multi-phase data DATA<0>_270.

Figure 4:
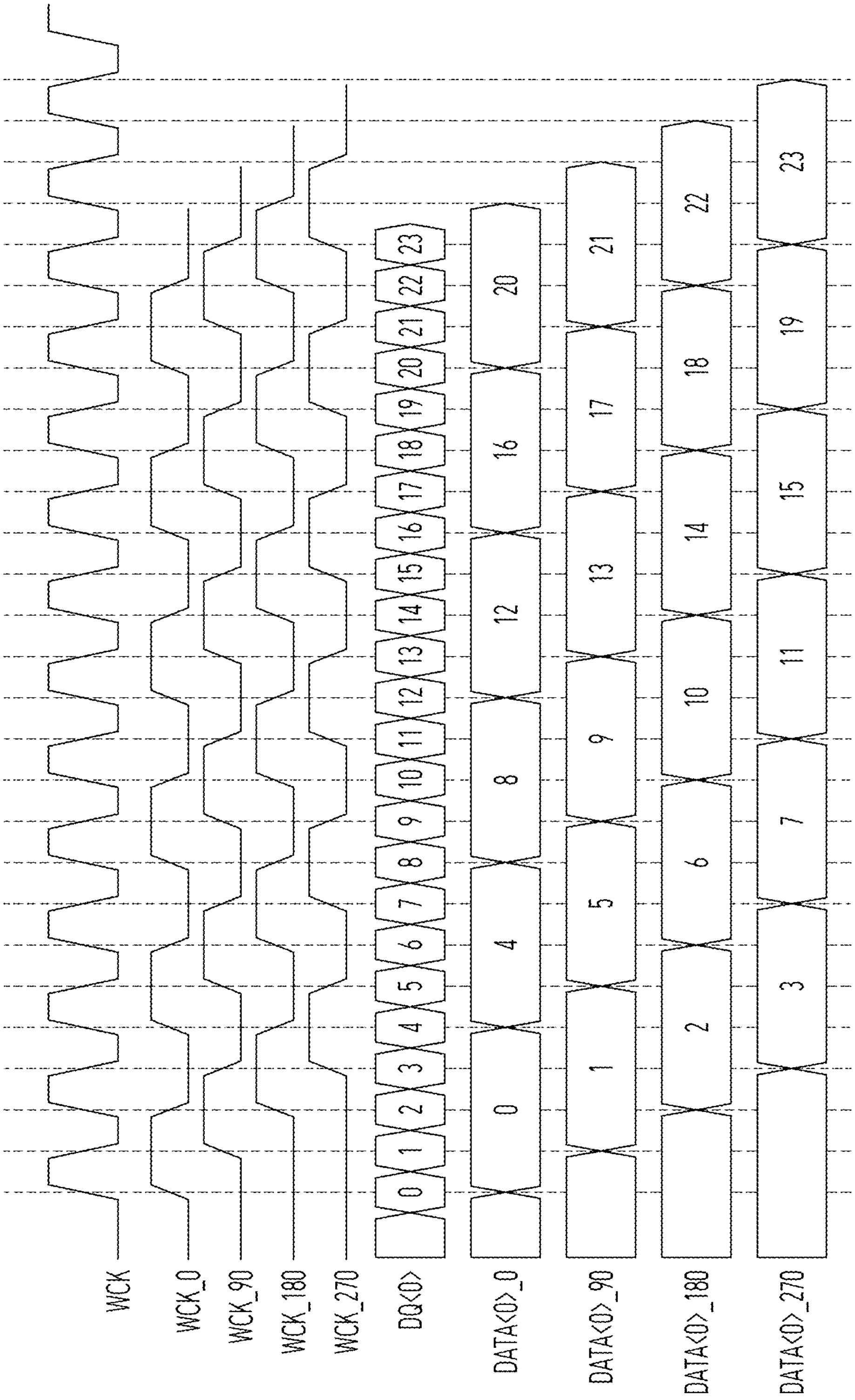
FIG. 4 is a timing diagram illustrating an operation of the data receiving circuit, in accordance with an embodiment of the present disclosure.

FIG. 4 is a timing diagram illustrating an operation of the data receiving circuit 110_0, in accordance with an embodiment of the present disclosure. Referring to FIG. 4, a relationship between the data clock WCK and the multi-phase clocks WCK_0, WCK_90, WCK_180, and WCK_270 and a relationship between the data of the data pad DQ<0> and the first multi-phase data DATA<0>_0, DATA<0>_90, DATA<0>_180, and DATA<0>_270 generated by the sampler 320 may be seen.

Although FIG. 3 illustrates only the data receiving circuit 110_0, the other data receiving circuits 110_1 to 110_M may also be configured in the same manner as illustrated in FIG. 3.

Figure 5:
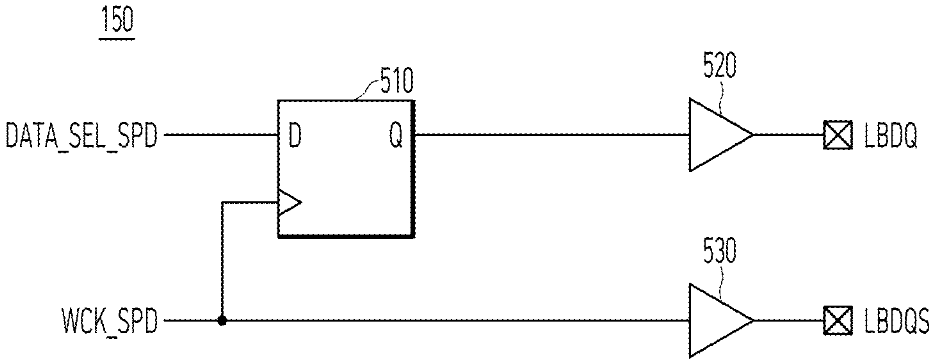
FIG. 5 is a block diagram illustrating an embodiment of a loopback circuit illustrated in FIG. 1.

FIG. 5 is a block diagram illustrating an embodiment of the loopback circuit 150 illustrated in FIG. 1.

Referring to FIG. 5, the loopback circuit 150 may include a loopback data sampler 510, a loopback data transmitter 520, and a loopback clock transmitter 530.

The loopback data sampler 510 may sample the data DATA_SEL_SPD selected by the data terminal selector 151 using the clock WCK_SPD obtained by the delay of the clock delay circuit 140. The loopback data sampler 510 may include a D flip-flop that samples the data DATA_SEL_SPD at a rising edge of the clock WCK_SPD obtained by the delay of the clock delay circuit 140.

The loopback data transmitter 520 may transmit data obtained by the sampling of the loopback data sampler 510 to the loopback data terminal LBDQ.

The loopback clock transmitter 530 may transmit the clock WCK_SPD used during the sampling operation of the loopback data sampler 510, that is, the clock WCK_SPD obtained by the delay of the clock delay circuit 140, to the loopback clock terminal LBDQS.

Referring back to FIGS. 1 to 5, the loopback operation of the memory 100 is described.

The multi-phase clock generation circuit 130 may generate the multi-phase clocks WCK_0, WCK_90, WCK_180, and WCK_279 using the data clock received by the data clock terminal WCK. The multi-phase clocks WCK_0, WCK_90, WCK_180, and WCK_279 are transmitted to the data receiving circuits 110_0 to 110_M, and the data receiving circuits 110_0 to 110_M may receive the data of the data terminals DQ<0> to DQ<M> using the multi-phase clocks WCK_0, WCK_90, WCK_180, and WCK_270.

Among the multi-phase data DATA<0>_0 to DATA<0>_270, DATA<1>_0 to DATA<1>_270, and DATA<M>_0 to DATA<M>_270 generated by the data receiving circuits 110_0 to 110_M, respectively, the data DATA<0>_SP to DATA<M>_SP having the phase selected by the phase selection information PHASE_SEL are transmitted to the loopback circuit 150 through the delay circuits 120_0 to 120_M. Although distances between the data receiving circuits 110_0 to 110_M and the loopback circuit 150 are different, a difference in the distances may be compensated for because the delay values of the delay circuits 120_0 to 120_M are different. That is, the time for data to be transmitted from the farthest data receiving circuit 110_0 to the loopback circuit 150 may be the same as the time for data to be transmitted from other data receiving circuits 110_1 to 110_M to the loopback circuit 150.

Among the multi-phase clocks WCK_0, WCK_90, WCK_180, and WCK_270, the clock WCK_SP having the phase selected by the phase selection information PHASE_SEL is delayed by the clock delay circuit 140. Accordingly, the same delay time as time taken in the process of data being transmitted from the data receiving circuits to the loopback circuit may be reflected in the clock WCK_SP.

The data terminal selector 151 may select one of the data DATA<0>_SPD to DATA<M>_SPD obtained by the delay of the delay circuits 120_0 to 120_M, according to the data terminal selection information DQ_SEL, and the loopback data sampler 510 of the loopback circuit 150 may sample the data DATA_SEL_SPD selected by the data terminal selector 151 using the clock WCK_SPD obtained by the delay of the clock delay circuit 140. The data obtained by the sampling of the loopback data sampler 510 is outputted to the loopback data terminal LBDQ by the loopback data transmitter 520, and the clock WCK_SPD is outputted to the loopback clock terminal LBDQS by the loopback clock transmitter 530.

Consequently, data selected by the data terminal selection information DQ_SEL and the phase selection information PHASE_SEL is looped back to a memory controller through the loopback data terminal LBDQ, and a clock for strobing the loopback data is looped back to the memory controller through the loopback clock terminal LBDQS. The memory controller may check whether the memory 100 has correctly received the data by checking the data and clock to be looped back. Because a data rate of the loopback data is ¼ of a data rate of the data received by the memory 100, there is a low possibility that an error occurs. Therefore, the memory controller may check the loopback data in which only the error occurring during the data receiving process is reflected, excluding the error occurring during the loopback process.

Although it is described according to embodiments described above that a loopback operation is performed in a memory, it is to be understood that the embodiments are not only applicable to the memory, but may also be used to verify a data receiving operation of a general integrated circuit.

Although the technical spirit of the present disclosure has been described above according to embodiments, this is only for describing the embodiments according to the concept of the present disclosure, and the present disclosure is not limited to the above embodiments. Various embodiments may be applied by those skilled in the art, to which the present disclosure pertains, within the scope of the technical spirit of the present disclosure. Furthermore, the embodiments may be combined to form additional embodiments.

What is claimed is:

1. An integrated circuit comprising:

a loopback clock terminal;

a loopback data terminal;

a first data terminal;

a second data terminal disposed farther from the loopback data terminal than the first data terminal;

a first data receiver configured to receive first data through the first data terminal;

a second data receiver configured to receive second data through the second data terminal;

a first sampler configured to sample, based on multi-phase clocks, the first data received by the first data receiver to generate multi-phase first data;

a second sampler configured to sample, based on the multi-phase clocks, the second data received by the second data receiver to generate multi-phase second data;

a first delay circuit configured to delay one of the multi-phase first data;

a second delay circuit configured to delay one of the multi-phase second data, the second delay circuit having a larger delay value than the first delay circuit;

a clock delay circuit configured to delay one of the multi-phase clocks;

a loopback data sampler configured to sample, based on a clock delayed by the clock delay circuit, one of data delayed by the first delay circuit and data delayed by the second delay circuit;

a loopback data transmitter configured to transmit data sampled by the loopback data sampler to the loopback data terminal; and a loopback clock transmitter configured to transmit the clock delayed by the clock delay circuit to the loopback clock terminal.

2. The integrated circuit of claim 1, further comprising:

a data clock terminal;

a data clock receiver configured to receive a data clock through the data clock terminal; and a divider configured to divide the data clock received by the data clock receiver to generate the multi-phase clocks.

3. The integrated circuit of claim 1, further comprising:

a first phase selector configured to select, based on a selected phase, first data having the selected phase, among the multi-phase first data to provide the first delay circuit with the selected first data;

a second phase selector configured to select second data having the selected phase, among the multi-phase second data to provide the second delay circuit with the selected second data; and a clock selector configured to select a clock having the selected phase, among the multi-phase clocks to provide the clock delay circuit with the selected clock.

4. The integrated circuit of claim 3, further comprising a data selector configured to select one of the data delayed by the first delay circuit and the data delayed by the second delay circuit to provide the loopback data sampler with the selected data.

5. The integrated circuit of claim 1, further comprising third to $N^{th}$ data terminals, where N is an integer equal to or greater than 4, wherein a delay value of the clock delay circuit corresponds to a delay value of a path from a data terminal disposed farthest from the loopback clock terminal, among the first to $N^{th}$ data terminals, to the loopback data sampler.

6. The integrated circuit of claim 1, wherein a data rate of the loopback data terminal is ¼ of a data rate of the first and second data terminals.

7. The integrated circuit of claim 2, wherein a quantity of the multi-phase clocks is 4, a frequency of the multi-phase clocks is ½ of a frequency of the received data clock, and the multi-phase clocks have a phase difference of 90 degrees from one another.

8. An integrated circuit comprising:

first to $N^{th}$ data receiving circuits configured to receive, based on multi-phase clocks, first to $N^{th}$ data through first to $N^{th}$ data terminals to generate first to $N^{th}$ multi-phase data, respectively, where N is an integer equal to or greater than 2;

first to $N^{th}$ delay circuits configured to delay, based on a selected phase, first to $N^{th}$ data having the selected phase, among the first to $N^{th}$ multi-phase data, respectively;

a clock delay circuit configured to delay a clock having the selected phase, among the multi-phase clocks; and a loopback circuit configured to transmit a clock delayed by the clock delay circuit to a loopback clock terminal, and transmit, based on the clock delayed by the clock delay circuit, one of first to $N^{th}$ data having the selected phase, delayed by the first to $N^{th}$ delay circuits, to a loopback data terminal.

9. The integrated circuit of claim 8, wherein the first to $N^{th}$ delay circuits have different delay values.

10. The integrated circuit of claim 9, wherein a delay circuit corresponding to a data terminal among the first to $N^{th}$ data terminals, which is disposed closest to the loopback clock terminal, has a largest delay value, among the first to $N^{th}$ delay circuits.

11. The integrated circuit of claim 10, wherein a delay value of the clock delay circuit corresponds to a delay value of a path from a data terminal disposed farthest from the loopback clock terminal, among the first to $N^{th}$ data terminals, to the loopback circuit.

12. The integrated circuit of claim 8, wherein each of the first to $N^{th}$ data receiving circuits includes:

a data receiver; and a sampler configured to sample data received by the data receiver based on the multi-phase clocks.

13. The integrated circuit of claim 8, wherein the loopback circuit includes:

a loopback clock transmitter configured to transmit the clock delayed by the clock delay circuit to the loopback clock terminal;

a loopback data sampler configured to sample, based on the clock delayed by the clock delay circuit, the one of first to $N^{th}$ data having the selected phase, delayed by the first to $N^{th}$ delay circuits; and a loopback data transmitter configured to transmit data sampled by the loopback data sampler to the loopback data terminal.

14. The integrated circuit of claim 8, wherein a data rate of the loopback data terminal is ¼ of a data rate of the first to $N^{th}$ data terminals.

15. The integrated circuit of claim 8, further comprising:

a data clock terminal;

a data clock receiver configured to receive a data clock through the data clock terminal; and a divider configured to divide the data clock received by the data clock receiver to generate the multi-phase clocks.

16. The integrated circuit of claim 15, wherein a quantity of the multi-phase clocks is 4, a frequency of the multi-phase clocks is ½ of a frequency of the received data clock, and the multi-phase clocks have a phase difference of 90 degrees from one another.

17. A method of operating an integrated circuit, the method comprising:

receiving, based on multi-phase clocks, first to $N^{th}$ data through first to $N^{th}$ data terminals to generate first to $N^{th}$ multi-phase data, respectively, where N is an integer equal to or greater than 2;

delaying, based on a selected phase, first to $N^{th}$ data having the selected phase, among the first to $N^{th}$ multi-phase data, respectively;

delaying a clock having the selected phase, among the multi-phase clocks; and transmitting the delayed clock to a loopback clock terminal, and transmitting, based on the delayed clock, one of the delayed first to $N^{th}$ data having the selected phase, to a loopback data terminal.

18. The method of claim 17, wherein the delaying of the first to $N^{th}$ data having the selected phase comprises delaying the first to $N^{th}$ data having the selected phase by different delay values.

19. The method of claim 17, wherein the transmitting comprises:

transmitting the delayed clock to the loopback clock terminal;

sampling, based on the delayed clock, the one of the delayed first to $N^{th}$ data having the selected phase; and transmitting the sampled data to the loopback data terminal.

20. The method of claim 17, further comprising:

receiving a data clock through a data clock terminal; and dividing the received data clock to generate the multi-phase clocks.

* * * * *